United States Patent [19]

Huang et al.

[11] Patent Number: 5,085,189
[45] Date of Patent: Feb. 4, 1992

[54] AIR-ASSISTED FUEL INJECTION APPLIED IN THE TWO-STROKE ENGINE OF FLAME-JET IGNITION TYPE

[75] Inventors: Huei-Huay Huang; Rong-Fang Hong, both of Hsinchu, Taiwan

[73] Assignee: Industrial Technology Research Institute, Hsinchu, Taiwan

[21] Appl. No.: 672,674

[22] Filed: Mar. 20, 1991

[51] Int. Cl.$^5$ .................... F02B 13/00; F02B 19/10; F02M 67/02
[52] U.S. Cl. .................... 123/275; 123/257; 123/267; 123/533; 123/467
[58] Field of Search ............ 123/256, 257, 266, 267, 123/275, 292, 299, 300, 531, 533, 467

[56] References Cited

U.S. PATENT DOCUMENTS

| | | | |
|---|---|---|---|
| 1,092,109 | 3/1914 | Kempton | 123/467 |
| 1,173,745 | 2/1916 | Rundlof | 123/275 |
| 3,154,058 | 10/1964 | Warren | 123/267 |
| 3,905,343 | 9/1975 | Ryan | 123/267 X |
| 4,020,801 | 5/1977 | Jarnuszkiewicz | 123/275 X |
| 4,239,023 | 12/1980 | Trucco | 123/292 X |
| 4,424,780 | 1/1984 | Simko | 123/275 |
| 4,519,356 | 5/1985 | Sarich | 123/533 |
| 4,754,740 | 7/1988 | Emmenthal et al. | 123/533 |
| 4,794,901 | 1/1989 | Hong et al. | 123/533 |
| 4,831,982 | 5/1989 | Baranescu | 123/275 |

FOREIGN PATENT DOCUMENTS

| | | | |
|---|---|---|---|
| 1044470 | 11/1953 | France | 123/267 |
| 0003168 | 1/1987 | Japan | 123/533 |

*Primary Examiner*—Willis R. Wolfe
*Attorney, Agent, or Firm*—Cushman, Darby & Cushman

[57] ABSTRACT

An air-assisted fuel injection applied in the two-stroke engine of flame-jet ignition type which a fuel pump and fuel pressure regulator valve establish stable fuel rail pressure. With respect to each cylinder, a pair of fuel injection electromagnetic valve inject fuel under this pressure. The injected fuel is not directly injected into the cylinder, but is blown into main combustion chamber in the cylinder and prechamber cavity in a torch-forming plug by high speed flowing air. The ignition is performed in such a manner that the pre-mixed fuel air mixture in the prechamber cavity is first ignited by a spark discharge to form specifically shaped flame jet which is injected from one or more orifices located on lower portion of the torch-forming plug so as to successively ignite the pre-mixed fuel air mixture in the main combustion chamber. The high speed flowing air is supplied in such a manner that a small air pump and an air pressure regulating valve provide constant pressure air and with respect to each cylinder, a pair of main air injection electromagnetic valve and subsidiary air injection electromagnetic valve properly inject high speed flowing air to assist in atomizing and transferring the fuel injected from the fuel injection electromagnetic valves.

7 Claims, 8 Drawing Sheets

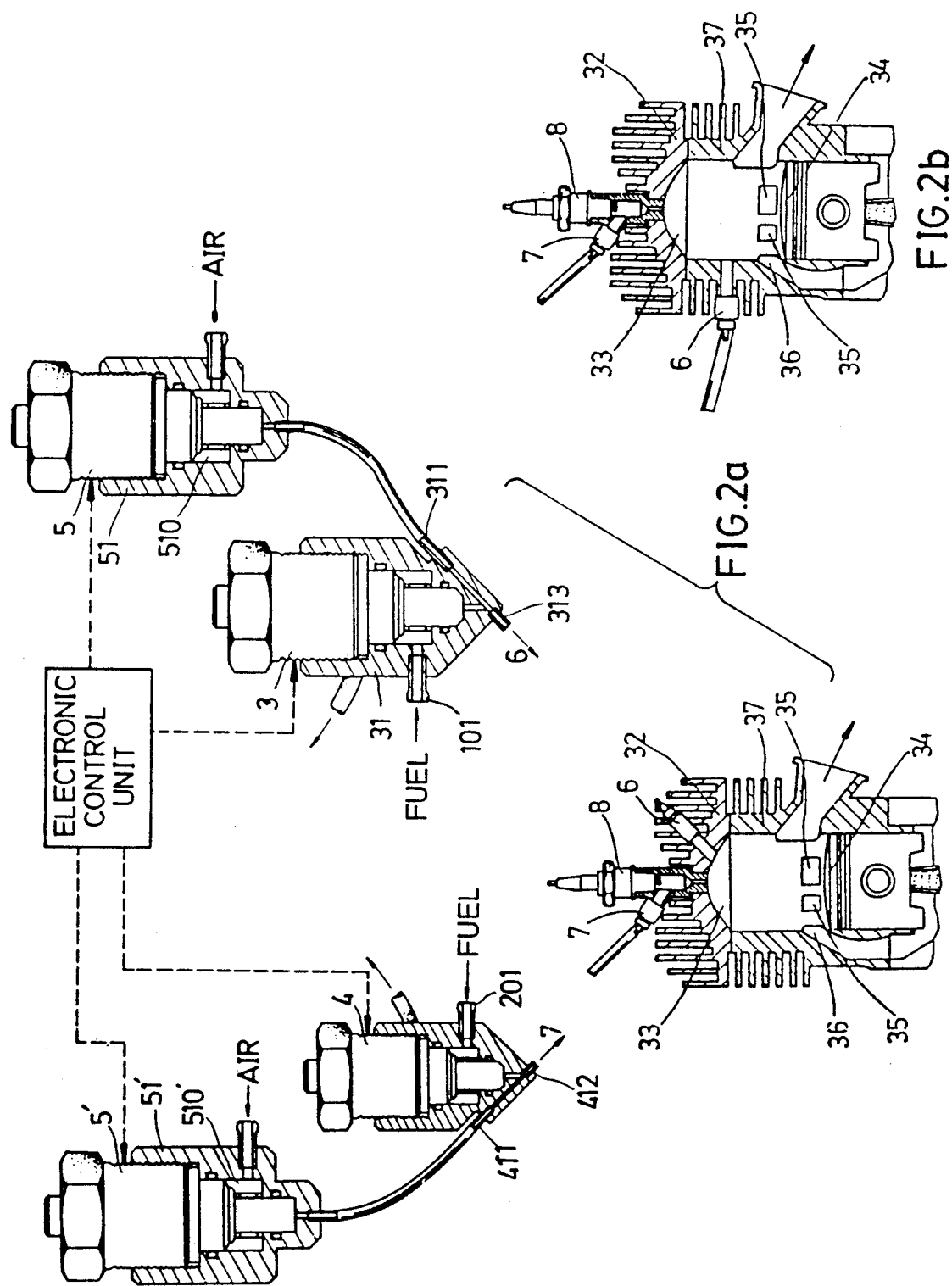

AIR-ASSISTED FUEL INJECTION APPLIED IN THE TWO-STROKE ENGINE OF FLAME-JET IGNITION TYPE

BACKGROUND OF THE INVENTION

The present two-stroke gasoline engine is of the scavenging type wherein through scavenging ports, fresh pre-mixed fuel air mixture flows into the cylinder to scavenge the residual gas out of an exhaust port; two shortcomings exist in such scavenging process as follows:

First, during scavenging process, part of the fresh fuel-air mixtures serving as scavenging gas flow often directly escapes out of cylinder through the exhaust port, causing the so-called short-circuitting loss of unburned mixture. When the engine operates under high loading condition, such loss appears more serious.

Second, during scavenging process, the burned gas is not totally scavenged and mixes with the fresh fuel air mixture. After the scavenging process ends, part of the burned gas remains in the cylinder, and when the engine operates under low loading condition, because the scavenging gas flow is weaker, the scavenging efficiency is correspondingly lower, and consequently, the ratio of burned residual gas to fresh fuel air mixture is too high. Such too high ratio is extremely apt to cause misfire of the mixture and lower the combustion efficiency.

The above two shortcomings are the major reasons why great amount of hydrocarbon is contained in the exhaust of a two-stroke gasoline engine.

SUMMARY OF THE INVENTION

It is a primary object of the present invention to provide a fuel injection system to replace conventional carburetor. Because the scavenging gas flow flowing from each scavenging passage of the cylinder is merely air flow, therefore the short-circuitting loss occurring in scavenging process is only loss of air without any fresh fuel air mixture. When the scavenging process is about to end, via the control of the electromagnetic valves, the pre-mixed fuel air mixture is appropriately injected from main fuel injection nozzle and subsidiary fuel injection nozzle into the cylinder. According to this principle, the short-circuitting loss of the fresh fuel-air mixture caused in common engine employing carburetor during scavenging process can be eliminated.

It is a further object of the present invention to provide the above system, wherein via the control of subsidiary fuel injection electromagnetic valve and subsidiary air injection electromagnetic valve, the pre-mixed fuel-air mixture is injected from subsidiary fuel injection nozzle to fill the prechamber cavity inside a flame-jet-forming plug with a ratio of air to fuel maintained within a range in which the fuel air mixture can be easily ignited by the conventional spark discharge. Therefore, after the spark discharge of the spark plug ignites the pre-mixed fuel-air mixture contained in prechamber cavity, through the orifice (or orifices), one or more flame jets will be formed to penetrate and successfully ignite the fuel-air mixture contained in the main combustion chamber. Applying the principle of ignition initialized by the flame jets with specific shape produced by the flame-jet-forming plug, the ratio of air to fuel respecting fuel air mixture contained in main combustion chamber can be raised to lean mixture condition. In this condition, the fuel-air mixture can still be ignited without misfiring. In other words, applying this principle, the misfiring limit of A/F ratio as to the fuel-air mixture contained in main combustion chamber of the engine can be extended to achieve lean burn object.

The advantages of lean burn include that the specific fuel consumption of the engine in common use can be lowered, and additionally, the drawback of being apt to misfire occurring in two-stroke engine under low loading can be improved. For example, when the air delivery ratio is lowered to 0.2, the proportion of the residual gas remaining in the cylinder will be consequently too high, and therefore totally misfiring or regionally misfiring of the mixtures in the cylinder is extremely easily caused to result in existence of great amount of hydrocarbon in the exhaust gas. By means of the present system, under low loading use condition, the air delivery ratio can be properly raised to increase air in-flow amount in order to reduce the proportion of remaining exhaust gas, and also, the mixture of fuel spray injected from main injection nozzle and air in the cylinder can be designed with an A/F ratio as above-mentioned lean mixture condition. In this condition, although the fuel air mixture can not be ignited by general spark plug, it can be ignited by aforesaid flame jets with specific shape to produce the desired low torque engine output, whereby during combustion process, the above misfiring caused by excessive residual gas can be avoided to acquire higher combustion efficiency. This is one of the application features of the present system.

The present invention can be best understood through the following description with reference to accompanying drawings wherein:

BRIEF DESCRIPTION OF THE DRAWINGS

FIGS. 2a and 2c are sectional working views of the above system employing a pair of air injection electromagnetic valves;

FIG. 2b is sectional view of the main injection nozzle with a cylinder disposed thereon;

DETAILED DESCRIPTION OF THE PREFERRED EMBODIMENT

Figure 1:
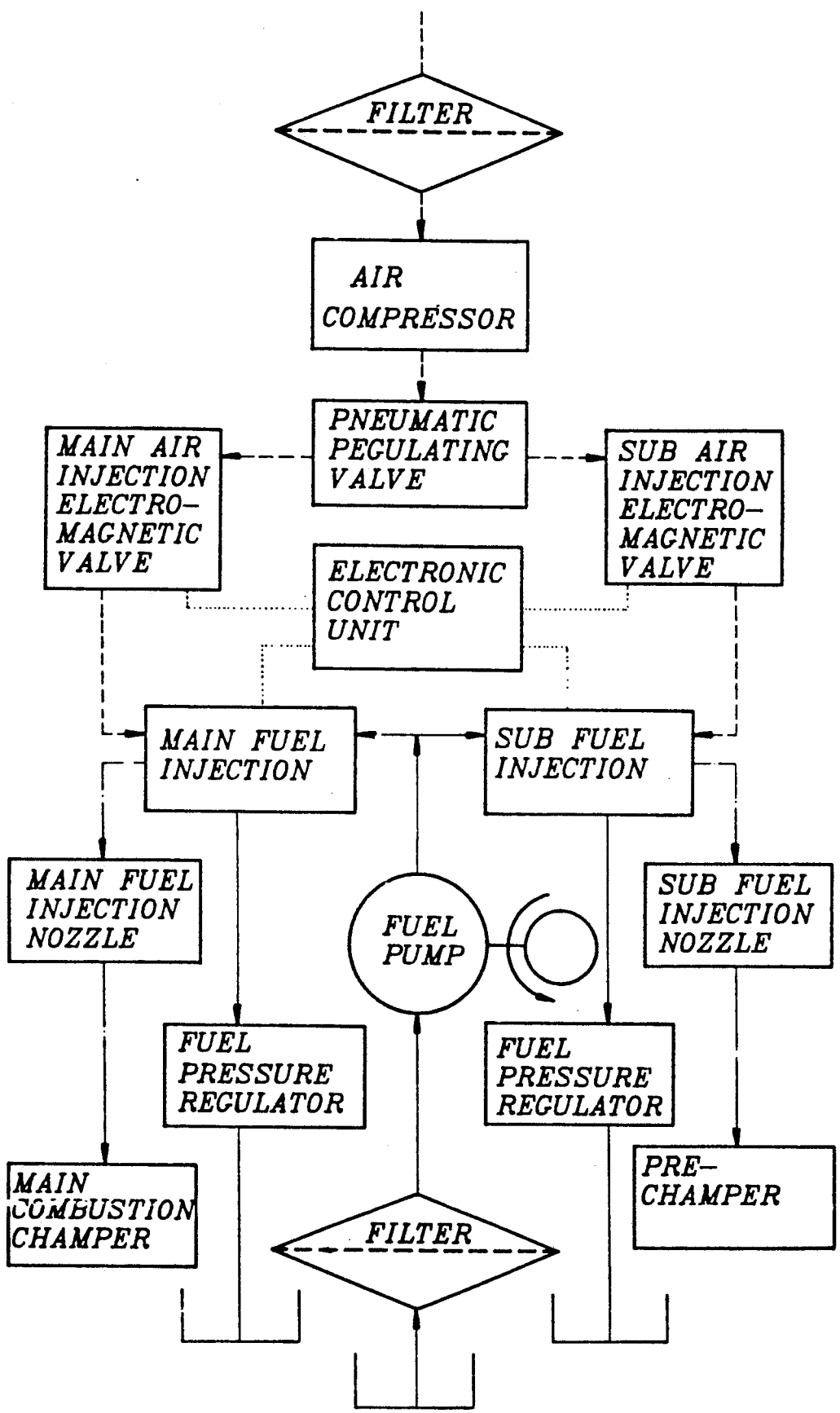
FIG. 1 is a flow chart of the fuel injection system of the present invention.
Figure 3:
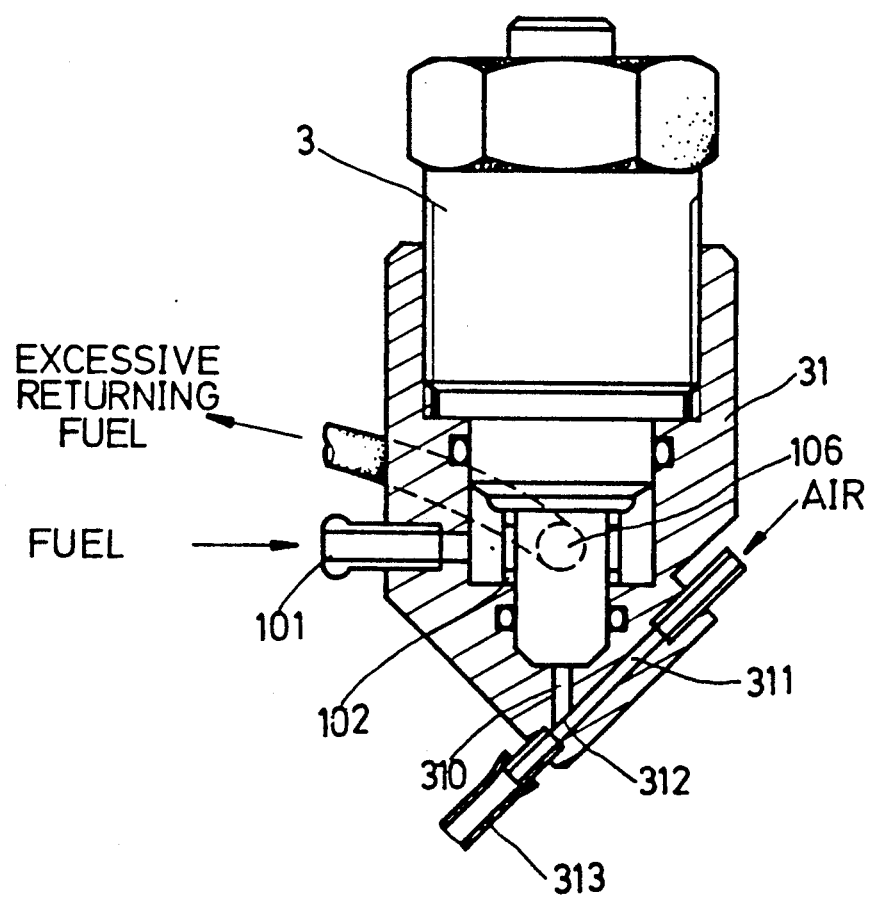
FIG. 3 is sectional view of the main fuel injection electromagnetic valve.

Please refer to FIG. 1. The present fuel injection system includes a fuel circuit established by a fuel pump 1 and fuel pressure regulator 2, wherein the fuel pump 1 can be a general motor-driven fuel pump and a fuel filter 11 is disposed in front of the fuel pump 1 to filter the fuel from impurity. The fuel pressure in the circuit is set and maintained steadily by a fuel pressure regulator and the pressurized fuel will be fed respectively into a main fuel injection electromagnetic valve 3 and a subsidiary fuel injection electromagnetic valve 4, both of which would be a top-feeding type or a bottom-feeding type as shown in FIG. 3, i.e., the fuel goes into a fuel inlet passage 101 of a main fuel injection electromagnetic valve fixing base 31 and then through a fuel filter 102 to be fed into the bottom of the main fuel injection electromagnetic valve 3. Except the fuel fed into main fuel injection electromagnetic valve 3, the remaining fuel will flow to the fuel pressure regulator 2 through a fuel returning hole 106. The opening and closing of the main fuel injection electromagnetic valve 3 are controlled by current pulse, while the output timing and duration of the current pulse are controlled by an electronic control unit C. (abbreviated to E.C.U.)

The fuel injected from the main fuel injection electromagnetic valve 3 will go through fuel passage 310 and meet the air flowing at high speed in main air passage 311 at a fuel-air crossing 312. The fuel and air are further mixed in a fuel-air mixing passage 313. Because the air flows at high speed, the injected fuel is crashed into extremely small fuel drops by the air to form uniform twin-fluid flow. The twin-fluid flow in the fuel-air mixing passage 313 is rapidly transferred to main injection nozzle 6 which is disposed on engine cylinder head 36 to directly inject the uniform fuel air mixture into the cylinder as shown in FIG. 2A.

Figure 4:
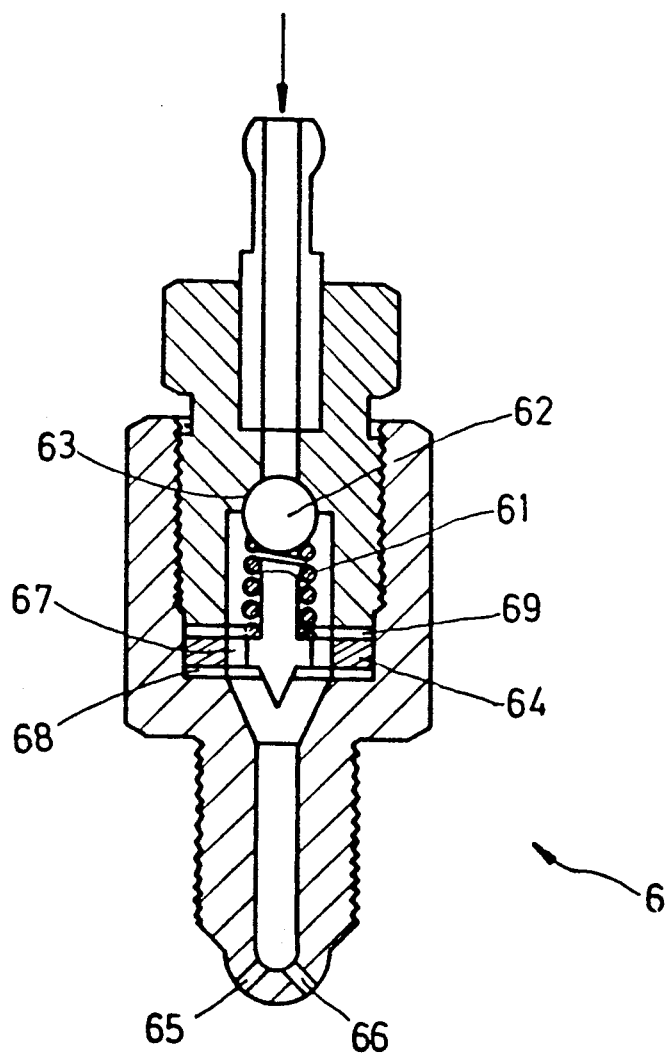
FIG. 4 is a sectional view of the main injection nozzle.

As shown in FIG. 4, the main injection nozzle 6 is an injection nozzle with non-return effect. When the above fuel-air mixture goes into the main injection nozzle 6, it must overcome pre-loading force of spring 61 to push a valve 62 away from a valve seat and then it goes through a tunnel 67 of a spring support 64 and is finally injected from the orifices 65, 66 to form a well atomized fuel spray with specific spray pattern according to the design of the orifices 65, 66. The main injection nozzle 6 can be alternatively disposed on engine cylinder 37 to inject the air-fuel mixture, as shown in FIG. 2B. When the fuel injection is completed, spring 61 will restore the valve 62 to the valve seat 63 so as to avoid back flow of high pressure gas during the combustion process occurring in combustion chamber 33. Additionally, gaskets 68, 69 are disposed to prevent leakage.

A subsidiary fuel injection electromagnetic valve 4, which is similar to the main fuel injection electromagnetic valve 3 in basic concept design, is also used to control fuel injection amount, i.e., current pulse transmitted from the electronic control unit C is used to control the opening and closing of the subsidiary fuel injection electromagnetic valve 4 to inject the fuel. The injected fuel goes through a fuel passage 201 of the fixing base 41 and then meets the high-speed air flow in a air passage 411 at a fuel-air mixing passage 412. the injected fuel will be further crashed and blown by the high-speed air flow to form twin-fluid flow. The high speed air flow must cooperate with injection fuel in amount so as to form a twin-fluid flow with an air/fuel ratio within a constant range. The pre-mixed fuel air mixture will be transferred to subsidiary fuel injection nozzle 7 and injected outward. The subsidiary fuel injection nozzle 7 is disposed on a flame-jet-forming plug 70 as shown in FIGS. 5A, 5B, 5C, 5D. The plug 70 includes the prechamber body 72 and a spark plug 8 and subsidiary fuel injection nozzle 7 secured thereon. The subsidiary fuel injection nozzle 7 is basically similarly structured to the main injection nozzle 6 as shown in FIG. 4, which has a non-return valve effect. However, the injection orifice 71 formed on front end thereof can be modified corresponding to prechamber cavity 73 to uniformly inject in the pre-mixed fuel-air mixture.

Figure 5A:
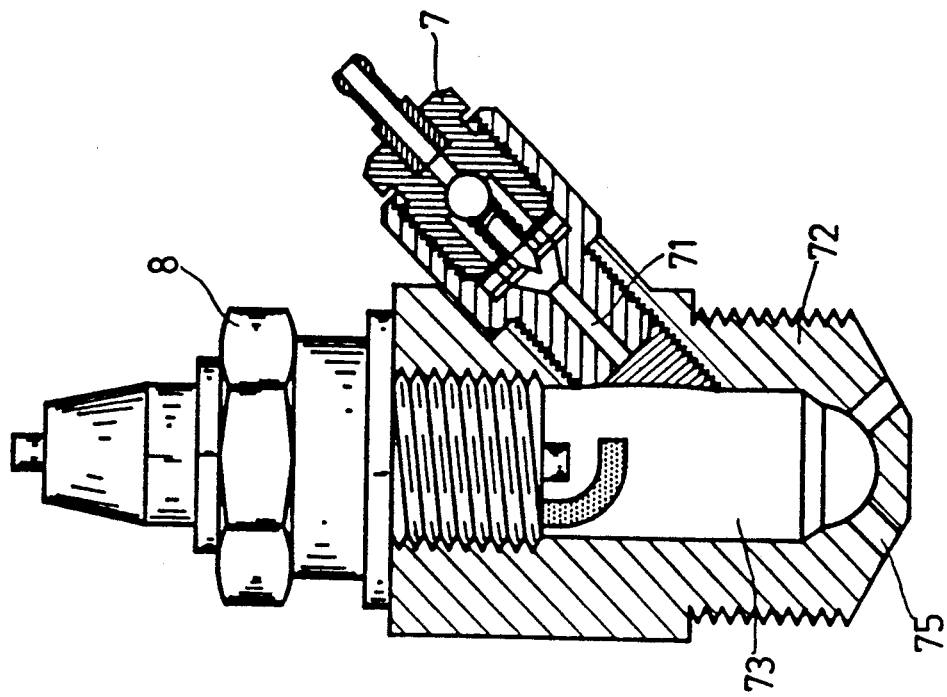
FIG. 5a is a sectional view of flame-jet-forming plug with single injection orifice and with the spark discharge position disposed on upper portion of prechamber cavity.
Figure 5B:
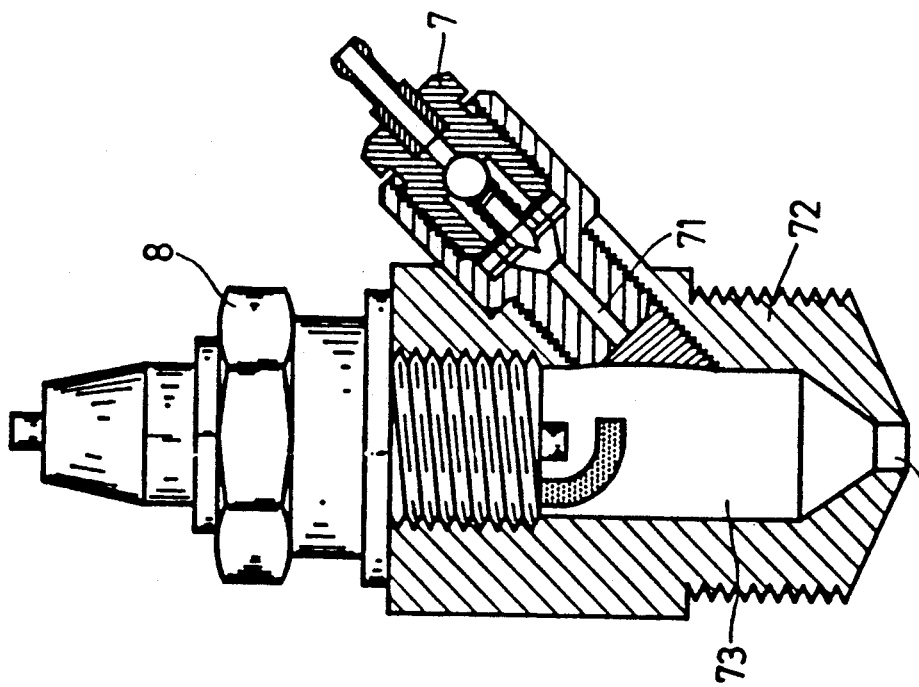
FIG. 5b is a sectional view of flame-jet-forming plug with multiple injection orifices and with the spark discharge position disposed on upper portion of prechamber cavity.
Figure 5D:
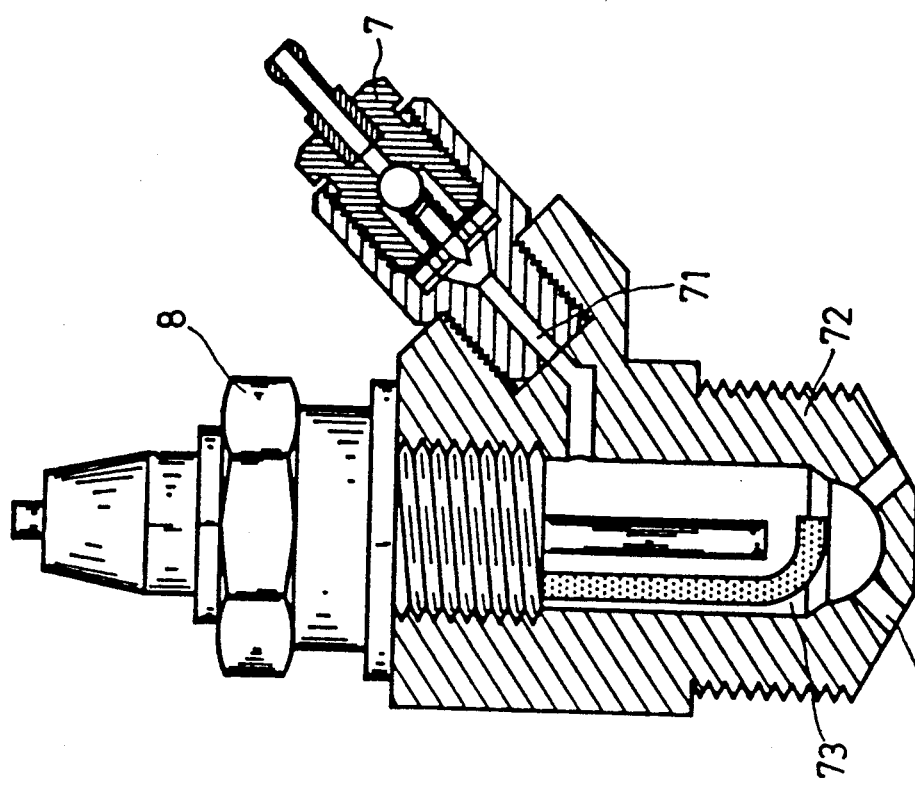
FIG. 5d is a sectional view of torch-forming plunger with multiple injection orifices and with the spark discharge position disposed on lower portion of prechamber cavity.
Figure 5C:
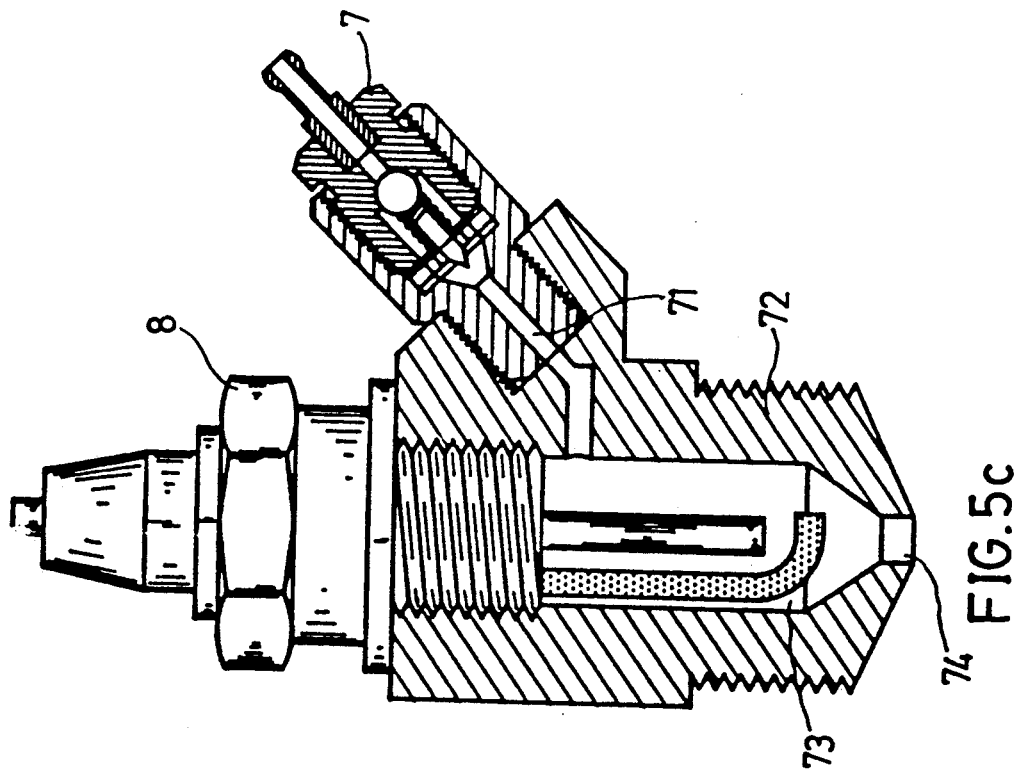
FIG. 5c is a sectional view of flame-jet-forming plug with single injection orifice and with the spark discharge position disposed on lower portion of the prechamber cavity.

The injected in pre-mixed fuel-air mixture can scavenge the original burned residual gas and fill up the prechamber cavity 73. In order to get a better scavenging efficiency of residual gas, the injection orifice 71 should be as close as possible to the upper portion of the prechamber cavity. The pre-mixed fuel air mixture is set under an extremely inflammable condition, e.g., the A/F ratio is within 10–13. Therefore, when spark discharge of spark plug 8 occurs, the fuel air mixture in prechamber cavity 73 is ignited immediately, and as the flame develops in this prechamber cavity 73, the pressure and temperature of the gases in the prechamber rises, forcing the hot gases out into the main combustion chamber 33 through the orifice 74 or orifices 75 as one or more turbulent flame jets. In FIGS. 5a and 5b, the spark discharge position of the spark plugs 8 of the plugs 70 are disposed on upper portion of the prechamber cavity 72. While in FIGS. 5c, 5d, the spark discharge position of the spark plugs 8 are disposed on lower portion of the prechamber cavity 73.

Further referring to FIG. 2, the plug 70 for forming flame jets is disposed on cylinder head 32 to substitute for conventional spark plug, whereby the flame jets injected from the plug 70 will penetrate and ignite the fresh fuel air mixture in the main combustion chamber 33, where the mixture is formed by the fuel spray injected from main fuel injection nozzle 8 and the scavenging pure air from the scavenging ports 35, 36.

Figure 6:
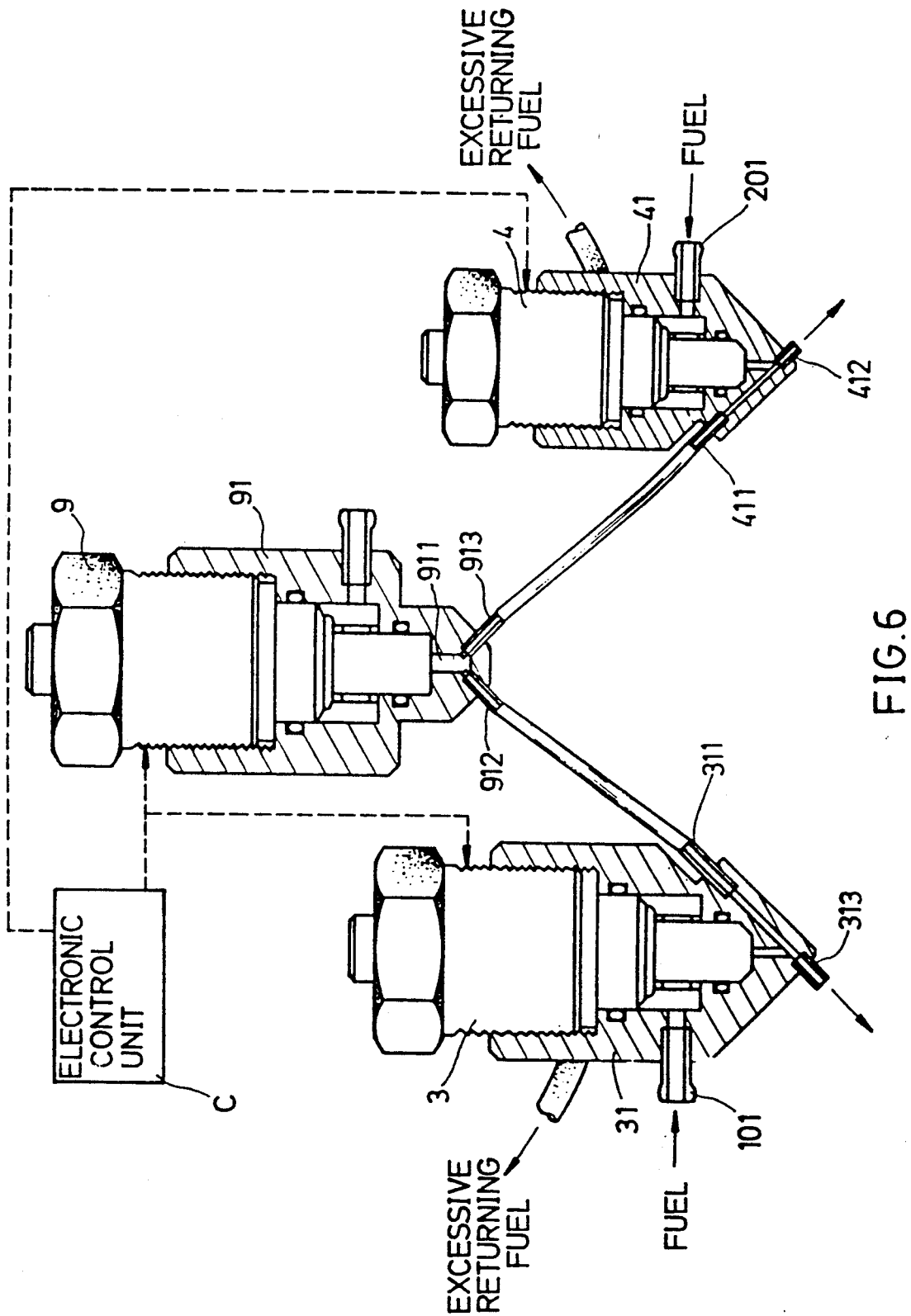
FIG. 6 is a sectional working view of a single air injection electromagnetic valve with larger injection amount, and a main fuel injection electromagnetic valve, and subsidiary-fuel injection electromagnetic valve.

As described above, the present system applies high speed air flow to respectively assist in the atomization and transfer of the fuel injected from fuel injection electromagnetic valves to supply the high speed air flow. As shown in FIG. 1, the present system further includes an air pump 10 with small displacement, an air pressure regulating valve 12, and two air injection electromagnetic valves 5,5', or as shown in FIG. 6, includes only one air electromagnetic valve 9.

Figure 2C:
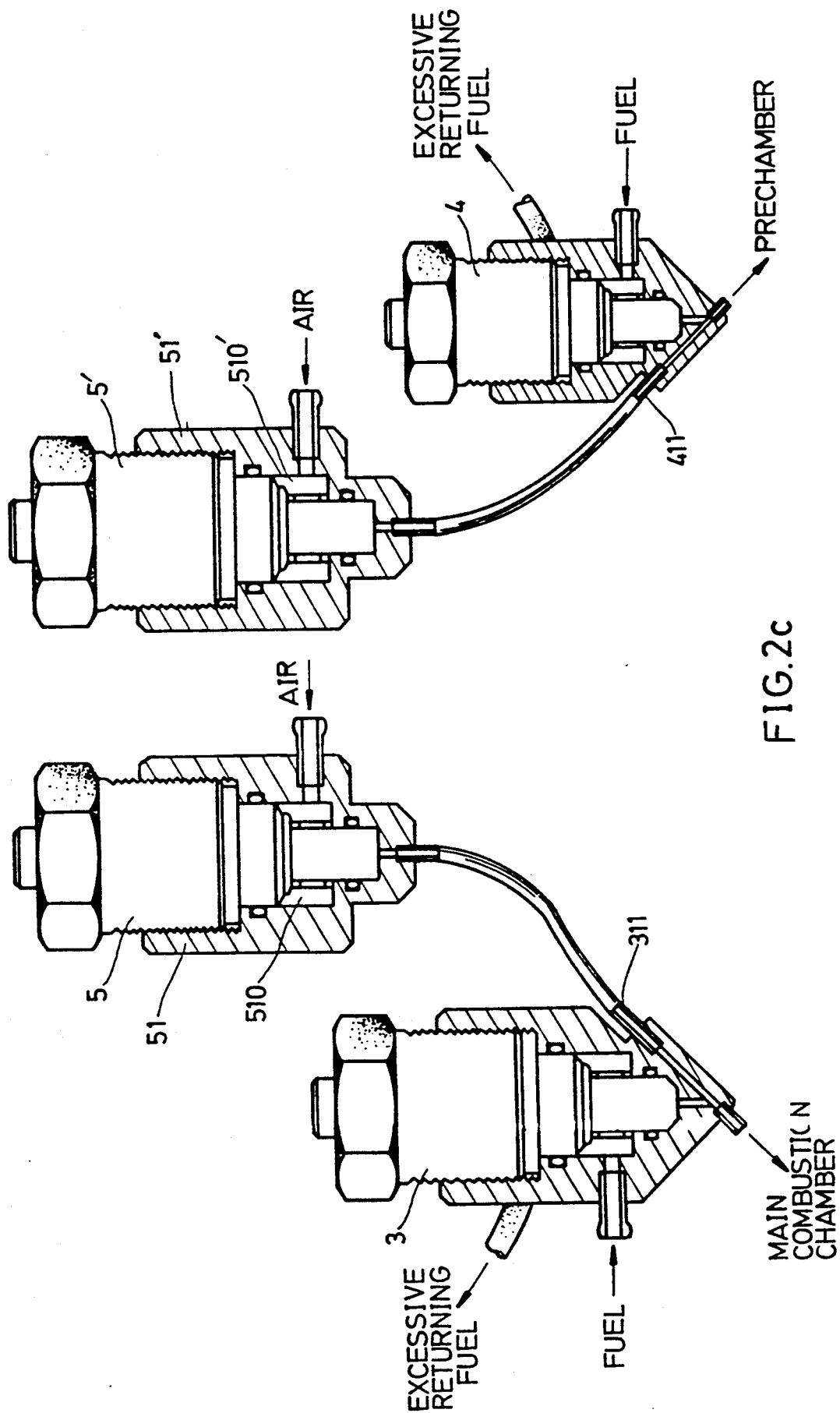

The small air pump 10 can be of reciprocating piston type, of which the shaft thereof can be driven by a belt coupled to engine crank shaft. The compressed air flows from outlet connector and is adjusted to a certain pressure range, such as 5–7 kg/cm, according to requirement of the system. The compressed air will respectively flow into and fill up air chambers 510, 510' of the main and subsidiary air injection electromagnetic valve fixing base 51, 51', as shown in FIGS. 2A, 2C. The main air injection electromagnetic valve 5 and subsidiary air injection electromagnetic valve 5' could be similar to the fuel injection electromagnetic valve in design. They all are of electromagnetic valve type, and the opening and closing of the valves thereof are controlled by current pulse output from electronic control unit C.

As shown in FIGS. 2A, 2C, the working procedures of the present system are as follows:

When the current pulse is input into main air injection electromagnetic valve 5, the valve thereof is opened to inject compressed air into air chamber 510. Since the air is under compression, therefore the injected air will flow at high speed (even at sound speed). When the current pulse terminates, the air injection stops. Thus, intermittent injected air flowing at high speed is supplied via control of opening and closing of the electromagnetic valve. The intermittent high speed air flow is the flowing air in above-mentioned main air passage 311, which serves to crash and mix with the fuel injected from main fuel injection electromagnetic valve 3 to form uniform pre-mixed fuel-air mixture. The fuel air mixture is transferred to main injection nozzle 6 and finally injected into the engine cylinder. Applying this principle, one can control input timing of current pulse to control timing of the fuel air mixture for going into the cylinder. Moreover, the duration of air injection can be controlled by means of controlling current pulse duration. Since the air pressure is constant, therefore the amount of injected air is in proportion to duration of current pulse controlling main air injection electromagnetic valve 5.

Similarly, when current pulse is input into subsidiary air injection electromagnetic valve 5', the valve thereof will be opened to inject compressed air into air chamber 510' to produce intermittent high speed injected air as above mentioned. The intermittent high speed air flow is the high speed air flow conducted into subsidiary air passage 411, which serves to atomize and transfer the fuel injected from subsidiary fuel injection electromagnetic valve 4. Moreover, the amount of air each time injected from subsidiary air injection electromagnetic valve 5' (in proportion to duration of input current pulse) will be in a certain range of proportion to the amount of fuel each time injected from subsidiary fuel injection electromagnetic valve 4, whereby the produced intermittent, high speed flowing and uniform fuel air mixture will be injected from subsidiary fuel injection nozzle 7 into prechamber cavity 73. The fuel air mixture will be maintained within a suitable A/F ratio range, such as 10–13, permitting the spark plug 8 to easily ignite the fuel-air mixture filling the prechamber cavity 73.

Further referring to FIG. 6, to facilitate the present system, the main air injection electromagnetic vale 5 and subsidiary air injection electromagnetic valve 5' can be combined to form an air injection electromagnetic valve 9 with larger injection amount. The valve 9 can be secured to an air injection valve fixing base 91. The amount of air each time injected into air passage 911 is equal to sum of those injected from main air injection electromagnetic valve 5 and subsidiary air injection electromagnetic valve 5'. In addition, the amounts of air injected from air passages 912 and 913 will respectively equal those injected from main air injection electromagnetic valve 5 and subsidiary air injection electromagnetic valve 5'.

The electronic control unit C will control the aforesaid fuel injection and air injection electromagnetic valves by means of calculating the signals detected and transmitted by the sensors, such as engine r.p.m, reference crank angle, throttle position, engine air inflow amount, etc., and then outputting independent current pulse, i.e., the current pulse output timing will determine the injection timing of each electromagnetic valve relatively to engine crank angle, while the pulse width will determine fuel injection amount and air injection amount of the electromagnetic valves. Therefore, via controlling main fuel injection electromagnetic valve 3, the amount of fuel injected into cylinder for combustion during each combustion cycle can be controlled, and through controlling main air injection electromagnetic valve 5, the timing of the pre-mixed fuel-air mixture of entering the cylinder can be controlled. Furthermore, by means of appropriately controlling the subsidiary fuel injection electromagnetic valve 7 and subsidiary air injection electromagnetic valve 5', the A/F ratio, injection time, etc. of pre-mixed fuel air-mixture injected into the prechamber cavity 73 can be accurately controlled.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. An air-assisted fuel injection applied in the two-stroke engine of flame-jet ignition type, comprising:

a fuel circuit wherein a fuel pump and a fuel pressure regulator supply a stable fuel pressure for said fuel circuit; a compressed air source including an air pump driven by engine crank shaft, and an air pressure regulating valve to produce suitable air pressure; with respect to each cylinder of the engine, the system should have four electromagnitic valves, including: a main air injection electromagnetic valve and a subsidiary air injection electromagnetic valve both of which are connected to said compressed air source, a main fuel injection electromagnetic valve and a subsidiary fuel injection electromagnetic valve, both of which are connected to said fuel pressure source; wherein an electronic control unit is used to control the injection of fuel and compressed air from aforesaid electromagnetic valves, whereby said main air injection electromagnetic valve injects high speed flowing air which meets the fuel injected from said main fuel injection electromagnetic valve at a fuel-air cross, the fuel being further crashed by and mixed with the air in a fuel-air mixing passage, and being rapidly transferred to a main injection nozzle disposed on the cylinder or cylinder head of engine, said sub. air injection electromagnetic valve injected high speed flowing air which meets the fuel injected from said sub-fuel injection electromagnetic valve at a fuel-air cross, the fuel being further crashed by and mixed with the air in a fuel-air mixing passage, and being rapidly transferred to a subsidiary fuel injection nozzle disposed on a flame-jet-forming plug, which is disposed on the cylinder head and includes a prechamber cavity to which a spark plug and said subsidiary injection nozzle are secured, the injected fuel-air mixture scavenge the original burned residual gas and is ignited by the spark discharge of the spark plug in said prechamber cavity, and then specifically shaped flame jet is injected through the orifice of the flame-jet-forming plug's tip, said specifically shaped flame jet penetrate and ignite said fuel-air mixture in main combustion chamber, where the mixture is formed by the fuel spary injected from main injection nozzle and the scavenging pure air from each scavenging port, said electronic control unit C controlling said fuel injection and air injection electromagnetic valves by means of calculating the signals detected and transmitted by each sensor of engine condition, and the current pulse output timing will determine the injection timing of each electromagnetic valve relatively to engine crank angle, while the pulse width will determine fuel injection amount and air injection amount of said electromagnetic valves.

2. A system of claim 1, wherein to facilitate said system, said main air injection electromagnetic valve and single subsidiary air injection electromagnetic valve are combined into an electromagnetic valve with larger air injection amount.

3. A system of claim 1, wherein said flame-jet-forming plug has single injection orifice or multiple orifices to form a single flame jet or multiple flame jets.

4. A system of claim 1, wherein the spark discharge position of said flame-jet-forming plug is dispesed on upper or lower portion of the said prechamber cavity, and wherein the injection orifice of said sub. injection nozzle is disposed on upper portion of the prechamber cavity.

5. A system of claim 1, wherein said fuel-feeding type applied by fuel injection electromagnetic valve are top-feeding type or bottom-feeding type.

6. A system of claim 1, wherein said main injection nozzle is an injection nozzle with non-return effect, whereby when the fuel air mixture goes into the injection nozzle, it should first overcome the pre-loading force of a spring to push a morable valve away from an valve seat, the fuel air mixture then being injected through the orifices to form an atomized fuel spray, and after the injection of the fuel spray ends, said spring restore said movable valve to said valve seat so as to avoid back flow of high pressure gas during the combustion precess occurring in main combustion chamber.

7. A system of claim 1 or claim 6, wherein said subsidiary injection nozzle is constructed similarly to said main fuel injection nozzle with non-return effect, and the injection orifices formed on said tip of said sub. injection nozzle can be modified corresponding to said prechamber cavity to evenly inject pre-mixed fuel air mixture and scavenge the burned residual gas in prechamber.

* * * * *